(12) United States Patent
Flores et al.

(10) Patent No.: US 9,471,564 B1
(45) Date of Patent: Oct. 18, 2016

(54) SMARTER ELECTRONIC READER

(71) Applicant: INTERNATIONAL BUSINESS MACHINES CORPORATION, Armonk, NY (US)

(72) Inventors: Christina I. Flores, Keller, TX (US); Romelia H. Flores, Keller, TX (US); Erik H. Katzen, Argyle, TX (US); Sumit Patel, Irving, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/060,919

(22) Filed: Mar. 4, 2016

Related U.S. Application Data

(63) Continuation of application No. 14/690,579, filed on Apr. 20, 2015.

(51) Int. Cl.
| | |
|---|---|
| *G06F 17/00* | (2006.01) |
| *G06F 17/28* | (2006.01) |
| *G06F 17/27* | (2006.01) |
| *G06F 17/21* | (2006.01) |

(52) U.S. Cl.
CPC ......... *G06F 17/2809* (2013.01); *G06F 17/271* (2013.01); *G06F 17/275* (2013.01); *G06F 17/211* (2013.01); *G06F 17/2836* (2013.01); *G06F 17/2872* (2013.01)

(58) Field of Classification Search
CPC ........... G06F 17/2836; G06F 17/2872; G06F 17/211
See application file for complete search history.

(56) References Cited

U.S. PATENT DOCUMENTS

| | | |
|---|---|---|
| 5,915,001 A | 6/1999 | Uppaluru |
| 8,700,382 B2 | 4/2014 | Rappoport et al. |
| 2006/0247914 A1* | 11/2006 | Brener ............... G06F 17/274 704/1 |
| 2009/0201223 A1 | 8/2009 | Stephens |
| 2009/0240667 A1* | 9/2009 | Baker ............... G06F 17/30056 |
| 2010/0070578 A1 | 3/2010 | Singer et al. |
| 2011/0172987 A1* | 7/2011 | Kent ..................... G06F 17/241 704/3 |
| 2013/0262080 A1* | 10/2013 | Marciano ............ G06F 17/2836 704/3 |
| 2014/0040946 A1 | 2/2014 | Gates, III et al. |
| 2014/0046661 A1 | 2/2014 | Bruner |
| 2014/0108675 A1 | 4/2014 | Wu |
| 2014/0122990 A1 | 5/2014 | Puppin |

OTHER PUBLICATIONS

Dalgaard, Rune, "Scholarly Collections on the Web: Media Reconfigurations at Play", Human IT: 7.2 (2004), pp. 138-170, Journal for Information Technology Studies as a Human Science.

(Continued)

*Primary Examiner* — Andrew McIntosh
(74) *Attorney, Agent, or Firm* — Samuel A. Waldbaum

(57) ABSTRACT

Embodiments of the present invention provide methods, computer program products, and systems for enriching and customizing one or more portions of textual content. Embodiments of the present invention analyze one or more portions of the textual content and customize the textual content based on preferences of a user interacting with the textual content. Embodiments of the present invention can present customized or original textual content to users requesting textual content.

1 Claim, 5 Drawing Sheets

(56) References Cited

OTHER PUBLICATIONS

Ibanez et al., "Dynamic Customization of eTextBooks", 1st International Workshop on Cloud Education Environments (WCLOUD 2012), pp. 18-21.

Jin, Sung-Hee, "Visual design guidelines for improving learning from dynamic and interactive digital text", Computers & Education 63 (2013), pp. 248-258, © 2012 Elsevier Ltd., All rights reserved, pp. 1-11, <http://dx.doi.org/10.1016/j.compedu.2012.12.010>.

Kroes, Micha, "Creating the new eTextBook", Sep. 23, 2013, Master [Thesis] Software Engineering, Supervisor: Hans Dekkers, Organisation: Trifork, University of Amsterdam, pp. 1-52.

Topac et al., "Software Architecture for Better Text-Based Information Accessibility", 2009 Fifth Advanced International Conference on Telecommunications, AICT'09, © 2009 IEEE, pp. 198-202, DOI 10.1109/AICT.2009.41.

IBM: List of IBM Patents or Patent Applications Treated as Related (Appendix P), May 4, 2016, pp. 1-2.

Pending U.S. Appl. No. 14/690,579, filed Apr. 20, 2015, titled "Smarter Electronic Reader,", pp. 1-33.

* cited by examiner

SMARTER ELECTRONIC READER

BACKGROUND OF THE INVENTION

The present invention relates generally to the field of content enrichment, and more particularly to enriching textual content based on characteristics of a user.

Textual content may be presented electronically to a user of a computer system subsequent to fulfilling the user's request to receive the textual content. The manner in which the textual content is presented can be static and open to interpretation, based, at least in part on, characteristics of the user. For example, a first user (e.g., a Spanish speaking user) and a second user (e.g., an experienced financial expert) may request to receive the same textual content (e.g., newspaper article, magazine, e-book, etc.). In this instance, the first and the second user will be presented with unmodified, static textual content, regardless of differences between the users (e.g., comprehensive ability, language barrier, subject matter exposure, etc.).

SUMMARY

According to an embodiment of the present invention, a method for enriching textual content based on characteristics of a user is provided. A computer authenticates an identify of a user and retrieves a user profile that corresponds to the identity of the user. The computer analyzes the user profile to determine a textual content preference contained within the user profile and determines the textual content preference is that a scientific terminology is to be displayed in a predetermined language. The computer receives a content to be displayed and identifies a language that is used in the content to be displayed, wherein the language of the content is different than the predetermined language. The computer analyzes the content by parsing a text contained within the content to identify any scientific terminology phrases contained within the text of the content and determines an equivalent phrase in the predetermined language for each of identified scientific terminology phrases contained within the text of the content. The computer modifies the content by replacing each of identified scientific terminology phrases contained within the text of content with the equivalent phrases in the predetermined language. The computer displays the modified content, wherein the displayed content contains both the predetermined language and the language of the content.

DETAILED DESCRIPTION

Embodiments of the present invention provide efficient and cost-effective systems and methods for enriching and customizing one or more portions of textual content based, at least in part, on characteristics of a user of a computer system. Embodiments of the present invention provide systems and methods that can selectively translate and modify one or more portions of the textual content. In this manner, as discussed in greater detail later in this specification, embodiments of the present invention can be used to extend capabilities of computer systems that are involved in presenting textual content to one or more users by providing customized textual content to the one or more users.

Figure 1:
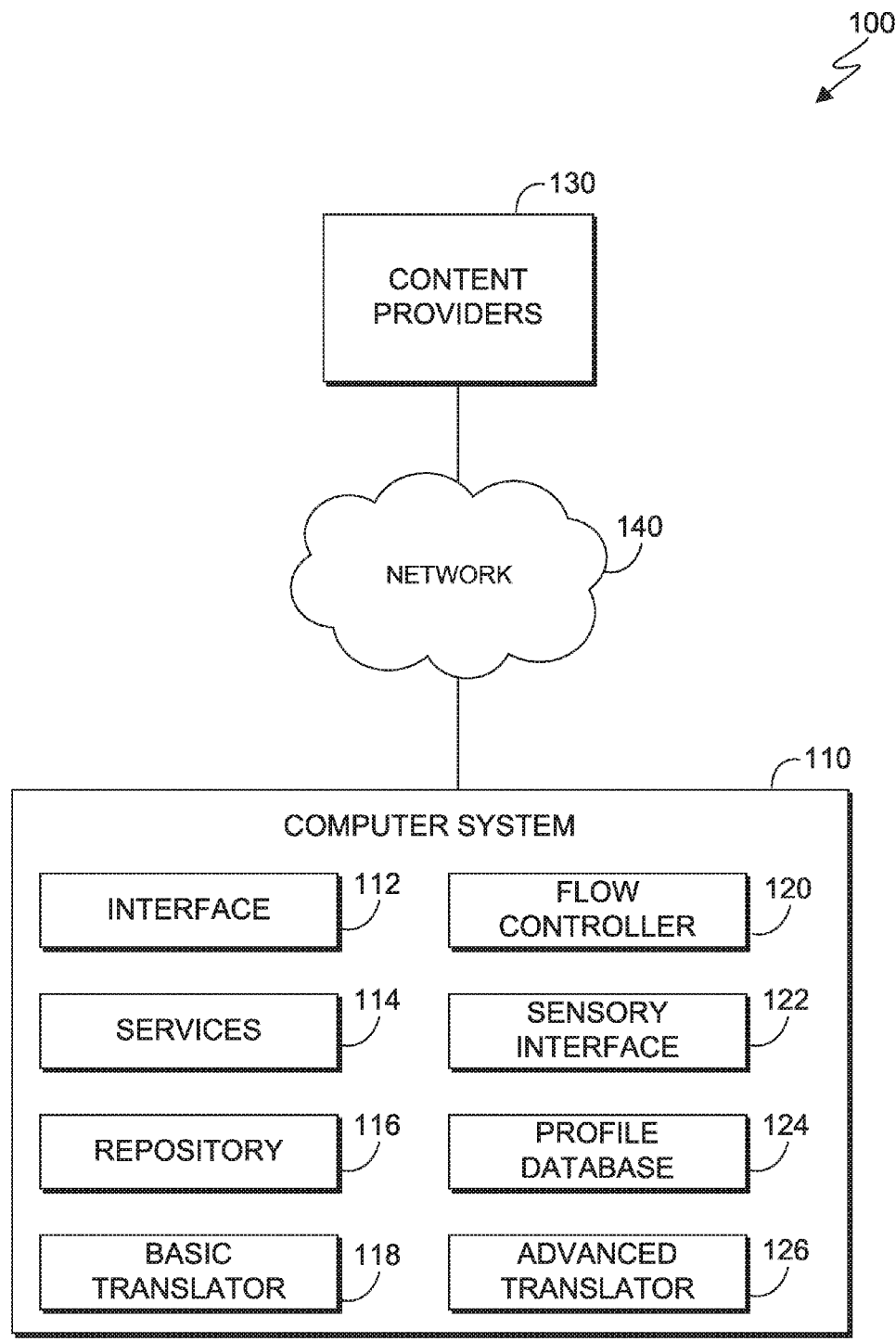
FIG. 1 is a block diagram of a computing environment, in accordance with an embodiment of the present invention.

FIG. 1 is a functional block diagram of computing environment 100, in accordance with an embodiment of the present invention. Computing environment 100 includes computer system 110, and content providers 130, interconnected over network 140. Computer system 110 can be a desktop computer, laptop computer, specialized computer server, or any other computer system known in the art. In certain embodiments, computer system 110 represents a computer system utilizing clustered computers and components to act as a single pool of seamless resources when accessed through network 140. For example, such embodiments may be used in data center, cloud computing, storage area network (SAN), and network attached storage (NAS) applications. In certain embodiments, computer system 110 represents a virtual machine. In general, computer system 110 is representative of any electronic device, or combination of electronic devices, capable of executing machine-readable program instructions, as described in greater detail with regard to FIG. 5.

Computer system 110 includes interface 112, services 114, repository 116, basic translator 118, flow controller 120, sensory interface 122, profile database 124, and advanced translator 126. In this embodiment, computer system 110 presents textual content to a user of computer system 110. For example, the user of computer system 110 may be a student reading an e-textbook on computer system 110 (e.g., an e-reader). Furthermore, there may be an author and/or publisher of the e-textbook as well as a supervisor that may supervise the student. As discussed in greater detail later in this specification, the user of computer system 110, author and/or publisher of the textual content, and supervisor of the user of computer system 110 may all affect a manner in which computer system 110 presents the textual content to the user of computer system 110. Computer system 110 exchanges data (e.g., textual content to be presented to the user, user preferences, etc.) between content providers 130 via network 140.

Interface 112 is a program that provides an interface between a user of computer system 110 and a plurality of applications that reside on the client device. A user interface, such as interface 112, refers to the information (such as graphic, text, and sound) that a program presents to a user, and the control sequences the user employs to control the program. A variety of types of user interfaces exist. In one embodiment, interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard.

The actions in GUIs are often performed through direct manipulation of the graphical elements. In another embodiment, interface 112 is a script or application programming interface (API). As discussed in greater detail herein, the user of computer system 110 interacts with interface 112 to access and select available textual content. Accordingly, interface 112 presents available textual content to the user of computer system 110. The phrase, "available textual content," as used herein, refers to textual content that the user of computer system 110 has granted access to interact with (e.g., read, write, etc.). In this embodiment, the user of computer system 110 is granted access if the user has purchased the textual content, the textual content was provided by an author and/or publisher, the textual content was provided by a supervisor, etc.

Services 114 provide data from various services (e.g., social analytics, reader profiles, etc.) to be leveraged by computer system 110. In this embodiment, a social analytics service provides data from computer system 110 to social media services. For example, using the social analytics service, computer system 110 can update status information on social media services such as, "Completed Read: BOOK TITLE" or, "Reader, Joe Doe, has read ten fantasy books this summer." In this embodiment, a reader profile service provides data from profile database 124 to a third-party service. The data provided is based, at least in part, on profile information stored in profile database 124, such as, age, interests, location, and preference information. The preference information may include one or more books that interest a user of computer system 110, favorite genres of the user of computer system 110, alteration trends, attentiveness trends, etc. In another example, the social analytics service may receive an indication from a social media network that a user of computer system 110 has recently won a chess tournament. In this instance, services 114 provide this information from the social media network to computer system 110. Accordingly, computer system 110 may leverage this information in subsequent processing of textual content to make the textual content more customized for the user of computer system 110 (i.e., ensure that a book that the user of computer system 110 is reading does not provide novice descriptions and/or examples of chess).

Repository 116 contains catalogs of textual content (e.g., books, articles, magazines, etc.) and sets of customization rules that correspond to respective instances of textual content. For example, authors and/or publishers of textual content may specify a unique set of customization rules to control an extent to which the corresponding textual content can be altered. In another example, a set of customization rules may prevent individual customization of textual content, but may include alternate textual content that may be used for customization instead. Stated differently, an author may provide rules that specify to use alternative textual content for customization and prohibit individual customization for a user of computer system 110.

Basic translator 118 manipulates one or more portions of textual content. In this embodiment, a user of computer system 110 interacts with (e.g., reads, annotates, etc.) textual content (e.g., an e-book) on computer system 110. Furthermore, basic translator 118 uses a translation map to translate one or more portions of textual content between two or more different languages based, at least in part, on user preferences stored in profile database 124. For example, a user of computer system 110 may be not be proficient in English, but may be reading an English news article on computer system 110. In this instance, the user of computer system 110 may have user preferences stored in profile database 124 indicating that all non-technical, advanced-level English words are to be translated to a Spanish equivalent. Accordingly, basic translator 118 changes textual content of textual media to meet language preferences of a user of computer system 110.

Flow controller 120 interacts with interface 112, services 114, basic translator 118, profile database 124, advanced translator 126, and content providers 130. In this embodiment, flow controller 120 includes a plurality of components such as, a user profile updater, a preference analysis component, a supervisor control component, a book customization component, and a book retriever component. The user profile updater creates, updates, and/or stores preferences and information for profile database 124. The preference analysis component uses services 114 and sensory interface 122 to analyze user preferences. Subsequent to analyzing user preferences, the preference analysis component updates profile database 124 via the user profile updater. Components of computer system 110 can utilize the preference analysis component to provide recommendations for different textual content to be presented to a user. The supervisor control component controls additional features for supervisors. For example, in a classroom setting, a student may be a user of computer system 110 and his or her teacher may be a supervisor. In this instance, the supervisor may use the supervisor control component to control features such as, reading level, alternative vocabulary, assigned passages for reading, etc. The book customization component interacts with interface 112 to determine whether textual content requires customization based, at least in part, on user and author preferences stored in profile database 124. The book retriever component determines available textual content for a user of computer system 110.

Sensory interface 122 includes one or more components (e.g., camera, GPS, internal clock, etc.) to perform analytics and estimate an engagement level of a user of computer system 110. In this embodiment, the engagement level represents a relationship between the user of computer system 110 and a textual content that the user of computer system 110 interacts with (read, annotate, etc.). For example, a high engagement level for the user of computer system 110 may indicate that the user of computer system 110 is absorbed by and is enthusiastic about their interaction with the textual content. Sensory interface 122 uses one or more components to determine the engagement level for the user of computer system 110. For example, the one or more components of sensory interface 122 may include a front-facing camera disposed upon computer system 110. In this instance, sensory interface 122 uses the front-facing camera to determine the level of engagement for the user of computer system 110, based on various factors (e.g., monitoring eye movement (to detect attentiveness and/or sleepiness), monitoring mouth movement (to detect yawning), monitoring orientation and positioning of computer system 110, etc.). If the user of computer system 110 has a low engagement level while interacting with the textual content, then text content may be automatically modified to increase the engagement level of the user. In this embodiment, information retrieved and analyzed by sensory interface 122 are stored in repository 116.

Profile database 124 contains one or more profiles for each of one or more users of computer system 110. In this embodiment, profiles are created for users of computer system 110, authors and/or publishers of textual content, and supervisors. Profile information can include user background information, profile analysis information, social background, expertise, user diction, reading level, secondary language level, etc. In certain embodiments, additional information (e.g., proficiency in specific areas or fields, etc.) can be stored in profile database 124.

In yet another embodiment, additional profile information may include preferred style of writing (e.g., normal, verbose, abridged, terse, summary, action, romance, descriptive, etc.). Furthermore, multiple profiles may be created for a single user of computer system 110. For example, a user of computer system 110 may have a first profile (e.g., a school profile) and a second profile (e.g., a home profile). In this instance, each profile is stored in profile database 124. Furthermore, profiles can be updated in profile database 124 to reflect changes in user preferences or profile information. Accordingly, the user of computer system 110 may select a profile to be used from profile database 124 once the user begins to interact with textual content. In another embodiment, the user of computer system 110 can select different versions of the same profile. For example, a user begins to read a fantasy novel starting in May 2014 using a first profile. In this instance, sensory interface 122 may detect a high level of engagement, in which case a newer version of the first profile and associated metadata will be saved in profile database 124 to create a second profile. Later, when the user of computer system 110 begins to interact (e.g., read) other textual content, the user of computer system 110 can select either the first or the second profile to be activated. It should be understood, that associated metadata may include information that describes aspects of the textual content or customization of the textual content that made the user of computer system 110 engaged.

Network 140 can be, for example, a local area network (LAN), a wide area network (WAN) such as the Internet, or a combination of the two, and include wired, wireless, or fiber optic connections. In general, network 140 can be any combination of connections and protocols that will support communications between content providers 130 and computer system 110, in accordance with a desired embodiment of the invention.

Content providers 130 interacts with computer system 110 and components therein via network 140. In this embodiment, content providers 130 provide textual content requested by a user of computer system 110. A book retrieval component of flow controller 120 grants the user of computer system 110 access to requested textual content if the requested textual content is available textual content, as previously discussed. Additionally, content providers 130 include various social media tools and news feeds that are accessed to obtain and update preference settings (e.g., supplemental user preference settings from social media analytics, etc.)

Figure 2:
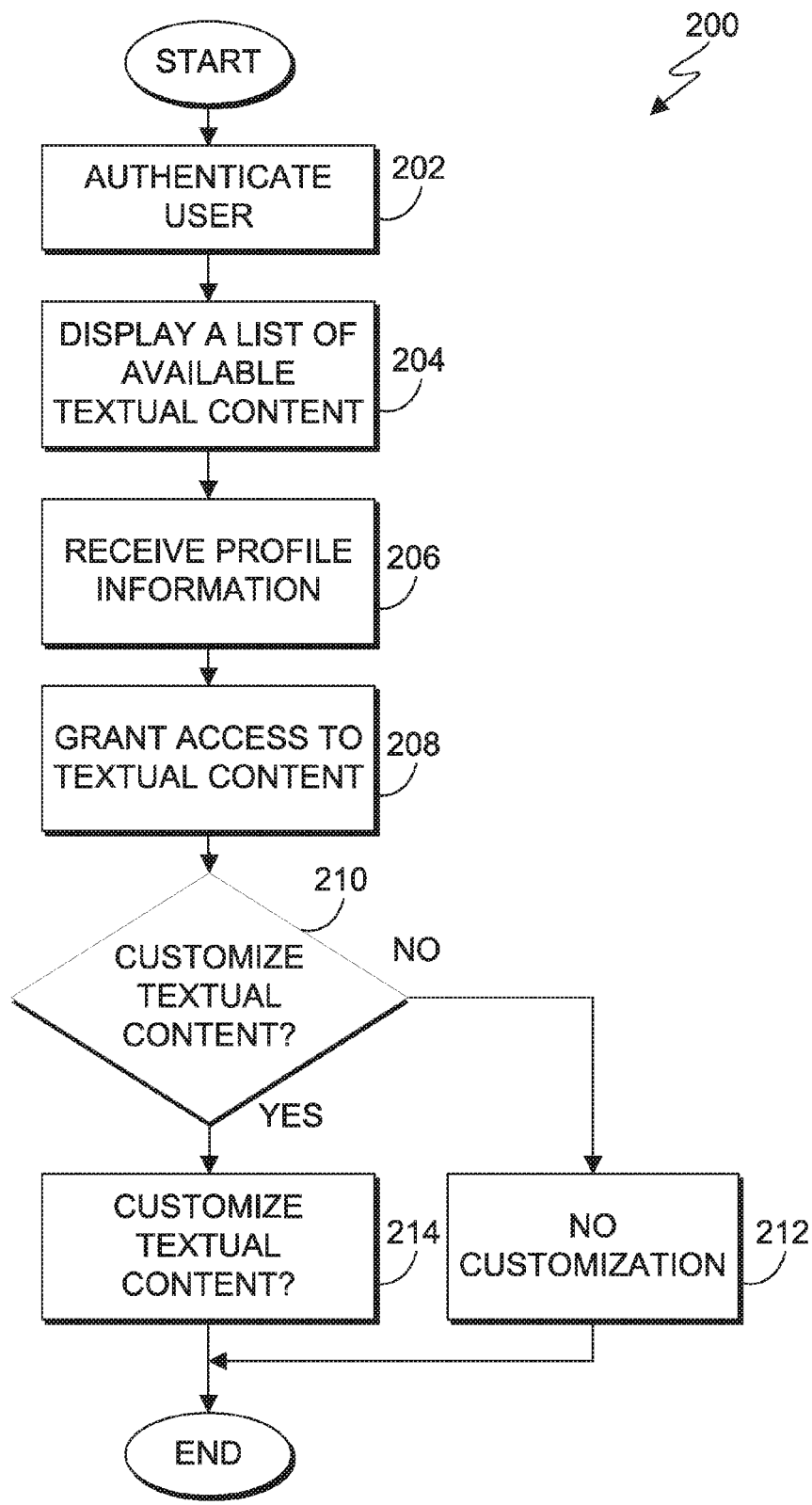
FIG. 2 is a flowchart illustrating operational steps for providing a customized textual content to a user of computer system, in accordance with an embodiment of the present invention.

FIG. 2 is a flowchart 200 illustrating operational steps for providing a customized textual content to a user of computer system 110, in accordance with an embodiment of the present invention. It should be understood, that operational steps described in FIG. 2 can be performed for one or more unique users of computer system 110, different textual content, and/or different profiles selected by the user of computer system 110.

In step 202, computer system 110 authenticates a user of computer system 110. An authenticated user of computer system 110 has access to available textual content. In this embodiment, computer system 110 uses interface 112 to provide information (e.g., username, password, etc.) to authenticate the user of computer system 110. In other embodiments, the user of computer system 110 may authenticate the user of computer system 110 in a different manner. For example, computer system 110 can utilize facial recognition technologies to authenticate the user of computer system 110. It should be understood that, for subsequent operational steps described in FIG. 2 (e.g., step 204 to step 214), the user of computer system 110 is an authenticated user of computer system 110.

In step 204, computer system 110 displays a list of the available textual content to the user of computer system 110. In this embodiment, the user of computer system 110 interacts with interface 112 for access to the available textual content. In one embodiment, one or more users of computer system 110 use computer system 110. In this instance, unique textual content may be displayed to each of the one or more users of computer system 110, based, at least in part, on the available textual content for each of the one or more users of computer system 110. As previously discussed, computer system 110 displays the list of available textual content which includes textual content that the user of computer system 110 has purchased and/or was provided by an author and/or publisher.

In step 206, computer system 110 receives profile information, based, at least in part, on authentication information of the user (provided in step 202) or on a profile selection made by the user of computer system 110. For example, the authentication information provided by the user of computer system 110 may be associated with one or more profiles for the user of computer system 110. Accordingly, the provided authentication information is associated with profile information for the user of computer system 110. In this embodiment, the user of computer system 110 interacts with interface 112 to select an existing profile stored in profile database 124. In one embodiment, the user of computer system 110 may interact with interface 112 to create a new profile, store the new profile in profile database 124, and select the newly created profile. Each profile may be associated with unique profile information describing, user background information, profile analysis information, social background, expertise, user diction, reading level, secondary language level, etc. Accordingly, after the user of computer system 110 uses interface 112 to select an existing profile or create a new profile, computer system 110 receives profile information associated with the profile.

In step 208, computer system 110 grants access to textual content requested by the user of computer system 110. In this embodiment, the user of computer system 110 interacts with interface 112 to select textual content to interact with (read, annotate, translate, etc.). The textual content requested by the user of computer system 110 is stored in repository 116 and is provided to the user of computer system 110 via interface 112. In certain embodiments, the user of computer system 110 may select textual content that is not an available textual content to the user of computer system 110. In this instance, interface 112 may alert the user of computer system 110 that the textual content requested is not available textual content. Furthermore, the user of computer system 110 may interact with computer system 110 to obtain the requested textual content.

In step 210, computer system 110 determines whether to customize the requested textual content. In this embodiment, flow controller 120 and components therein analyze the selected profile and the requested textual content. Furthermore, flow controller 120 may reference a set of customization rules (e.g., customization rules provided by an author/publisher of textual content and/or supervisor) that correspond to the requested textual content, stored in repository 116. In one embodiment, referencing the set of customization rules corresponding to the requested textual content can help determine an extent to customize the requested textual content. For example, the set of customization rules may prevent individual customization of textual content, but may include alternate textual content that computer system 110 can use for customization instead. In another embodiment, sensory interface 122 may determine that the user of computer system 110 has a low engagement level when interacting with the textual content. In this instance, flow controller 120 and components therein (e.g., book customization component, preference analysis component, etc.) determine a manner in which to customize the textual content, such that the user of computer system 110 will experience an increased engagement level.

In response to, computer system 110 determining to customize the requested textual content (step 210, yes branch), then computer system 110 customizes the textual content (step 214). In this embodiment, computer system 110 customizes the textual content using basic translator 118 and/or advanced translator 126, as described in FIG. 3 and FIG. 4.

In response to, computer system 110 determining not to customize the requested textual content (step 210, no branch), then computer system 110 does not customize the requested textual content (step 212).

Accordingly, computer system 110 presents the requested textual content to the user of computer system 110. In one embodiment, computer system 110 presents customized textual content to the user of computer system 110 (step 214). In another embodiment, computer system 110 presents original requested textual content to the user of computer system 110 (step 212).

Figure 3:
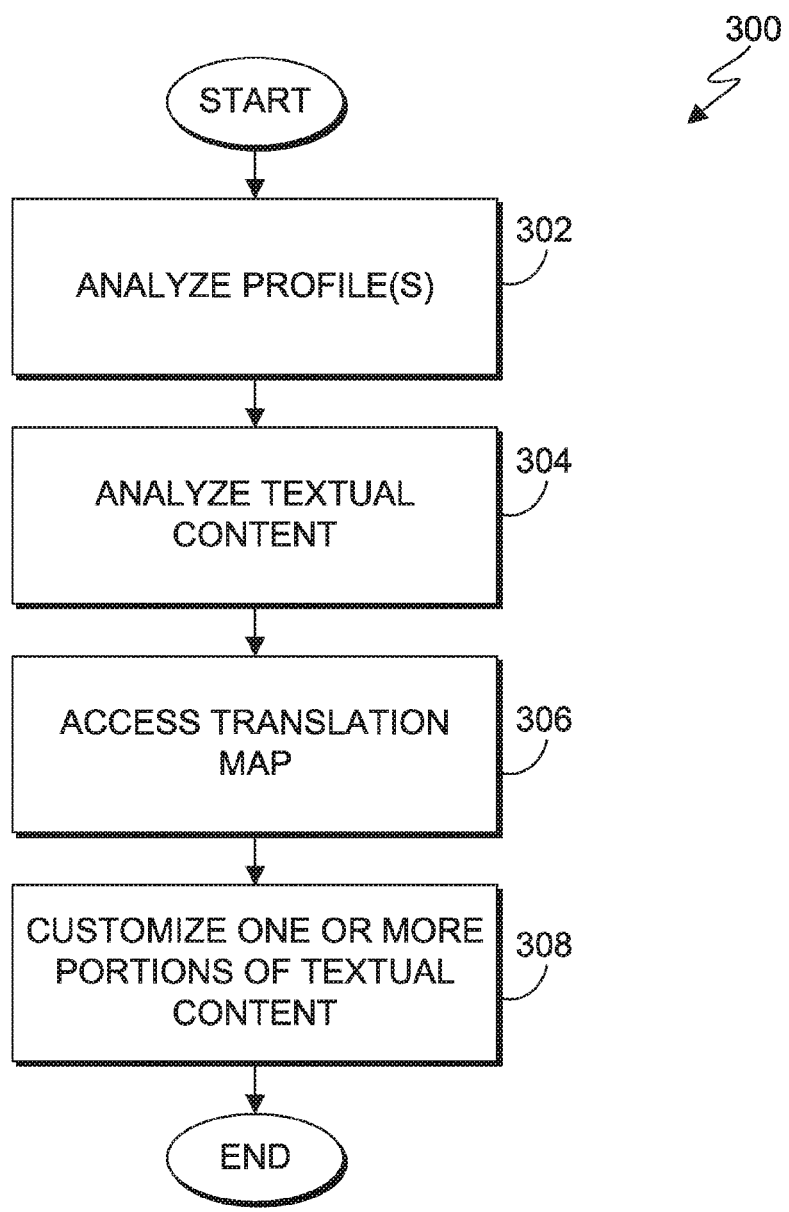
FIG. 3 is a flowchart illustrating operational steps for translating one or more portions of textual content, in accordance with an embodiment of the present invention.

FIG. 3 is a flowchart 300 illustrating operational steps for customization of requested textual content, in accordance with an embodiment of the present invention. As previously discussed, for operational steps described in FIG. 3, the user of computer system 110 is an authenticated user of computer system 110 and is granted access to interact with available textual content via interface 112. Furthermore, operational steps for customization of requested textual content may be performed subsequent to computer system 110 determining to customize the requested textual content, as described in step 210 of FIG. 2.

In step 302, computer system 110 analyzes profile information. As previously discussed, computer system 110 receives profile information, based, at least in part, on user authentication or a profile selection made by the user of computer system 110 (in step 206 of FIG. 2). In this embodiment, flow controller 120 and components therein (e.g., book customization component, preference analysis component, etc.) analyze the selected profile. Furthermore, computer system 110 uses the analyzed profile information in subsequent processing for determining a manner to customize the requested textual content. For example, the analyzed profile information may indicate that the user of computer system 110 practices basic vocabulary words in Spanish. In this instance, flow controller 120 and components therein may determine to customize the requested textual content such that the user of computer system 110 may increase user's proficiency in Spanish vocabulary.

In step 304, computer system 110 analyzes the requested textual content to determine a manner in which to customize the requested textual content. In this embodiment, computer system 110 uses various content analysis tools (e.g., natural language processing, semantic analysis, etc.) to analyze the requested textual content. For example, computer system 110 may analyze the requested textual content by parsing the requested textual content into one or more portions of textual content (e.g., words, phrases, etc.). The one or more portions of textual content in addition with analyzed profile information can be used in subsequent processing to determine a manner to customize the one or more portions of the textual content.

In step 306, computer system 110 accesses a translation map stored in repository 116. Furthermore, basic translator 118 uses the translation map and the one or more portions of textual content to customize (e.g., translate) the one or more portions of textual content between two or more different languages based, at least in part, on analyzed profile information. Implementing basic translator 118 to customize the one or more portions of textual content enables the user of computer system 110 to more easily understand customized (e.g., translated) vocabulary and phrases presented in the original requested textual content. For example, the original requested textual content may be in the user of computer system 110's primary language. In this instance, the user of computer system 110 may indicate (e.g., via profile selection) that the user of computer system 110 wishes to learn a secondary language. Accordingly, computer system 110 utilizes basic translator 118 to customize the original textual content, in accordance with analyzed profile information. In certain embodiments, computer system 110 references the set of customization rules that correspond to the requested textual content to determine an extent to customize the requested textual content.

In step 308, basic translator 118 customizes (e.g., translates) one or more portions of textual content between languages. In certain embodiments, computer system 110 can perform additional customization of the requested textual content based on the analyzed profile information (e.g., reading level, vocabulary, context, etc.). Accordingly, computer system 110 utilizes advanced translator 126 to perform additional customization of the requested content, as described in greater detail with regard to FIG. 4. It should be understood that, computer system 110 may present the customized textual content to the user of computer system 110 prior to additional customization, or subsequent to additional customization. In both instances, the extent of customization provided by basic translator 118 and advanced translator 126 can be modified, in accordance with the user of computer system 110 preference.

Figure 4:
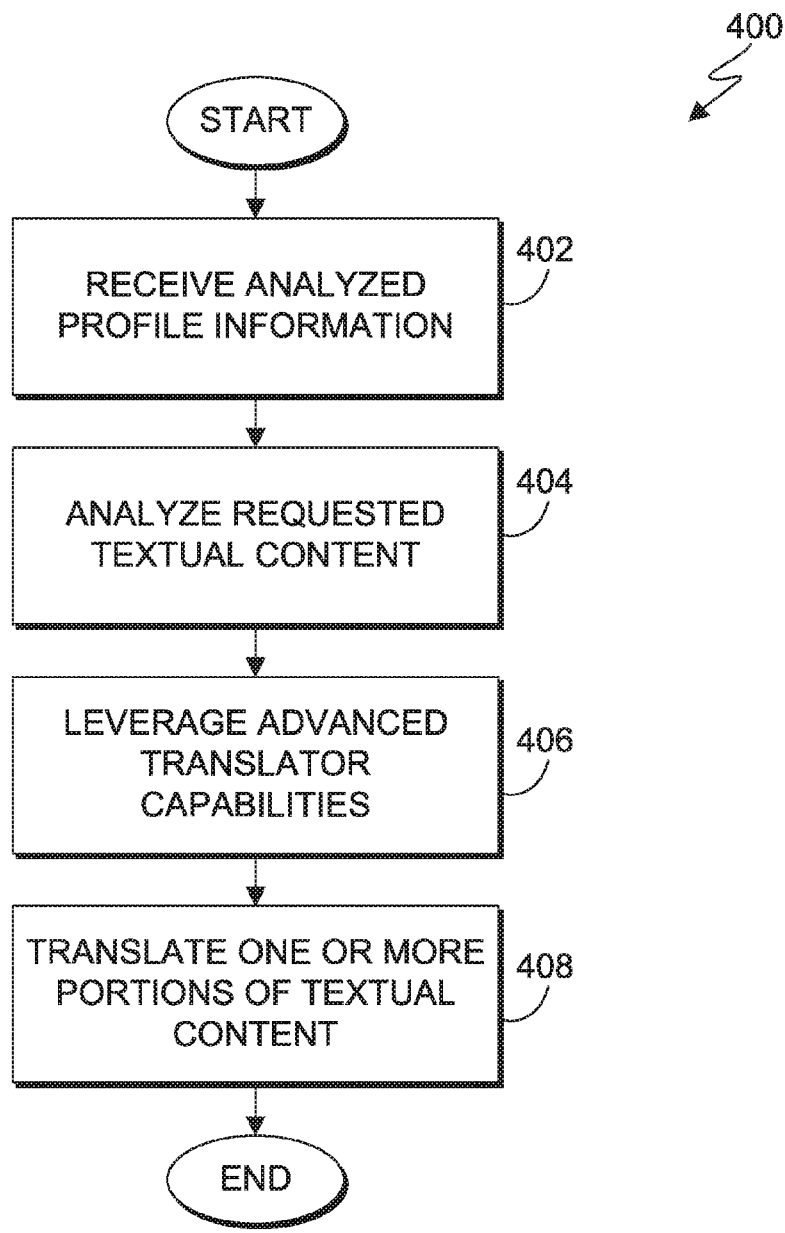
FIG. 4 is a flowchart illustrating operational steps for customizing one or more portions of textual content, in accordance with an embodiment of the present invention.

FIG. 4 is a flowchart 400 illustrating operational steps for additional customization of requested textual content, in accordance with an embodiment of the present invention. As previously discussed, for operational steps described in FIG. 4, the user of computer system 110 is an authenticated user of computer system 110 and is granted access to interact with available textual content via interface 112. Furthermore, operational steps for additional customization of textual content may be performed subsequent to computer system 110 determining to customize the requested textual content, as described in step 210 of FIG. 2. In other instances, operational steps for additional customization of textual content may be performed subsequent to customization the requested textual content, as described FIG. 3.

In step 402, computer system 110 receives analyzed profile information. Computer system 110 can utilize analyzed profile information for customization of the requested textual content (e.g., FIG. 3) and additional customization of the requested textual content (e.g., FIG. 4). In this embodiment, computer system 110 can use different portions of the analyzed profile information for additional customization of the requested content. For example, the analyzed profile information used for additional customization of the requested textual content may describe different information (e.g., reading level, comprehension level, genre preference, style preference, additional secondary language preferences, etc.).

In step 404, computer system 110 analyzes the requested textual content. As previously discussed, computer system 110 may analyze the requested textual content by parsing the requested textual content into one or more portions of textual content (e.g., words, phrases, etc.). The one or more portions of textual content in addition with analyzed profile information can be used in subsequent processing to determine a manner for additional customization of the one or more portions of the textual content. In certain embodiments, computer system 110 uses the one or more portions of textual content stored in repository 116 as a result of prior processing (e.g., step 304, FIG. 3).

In step 406, computer system 110 leverages advanced translator 126 capabilities. In this embodiment, computer system 110 uses advanced translator 126 for additional customization of the one or more portions of the textual content. Advanced translator 126 can perform additional customization at smaller or larger portions of the textual content (e.g., words, phrases, sentences, passages, etc.). Examples of advanced translator 126 capabilities may include: modifying one or more portions of the textual content to raise or lower reading level (e.g., may be performed by exchanging vocabulary words), altering smaller or larger portions of the textual content such that the textual content is directed towards a preferred genre or storyline preference, customizing one or more portions of the textual content to translate between writing eras (e.g., translating Old English textual content into modern English), etc.

In step 408, computer system 110 presents the requested textual content to the user of computer system 110. In this embodiment, one or more portions of the requested textual content may have not underwent any customization, underwent customization, and/or underwent additional customization. Accordingly, the user of computer system 110 may interact with the requested textual content via interface 112.

Figure 5:
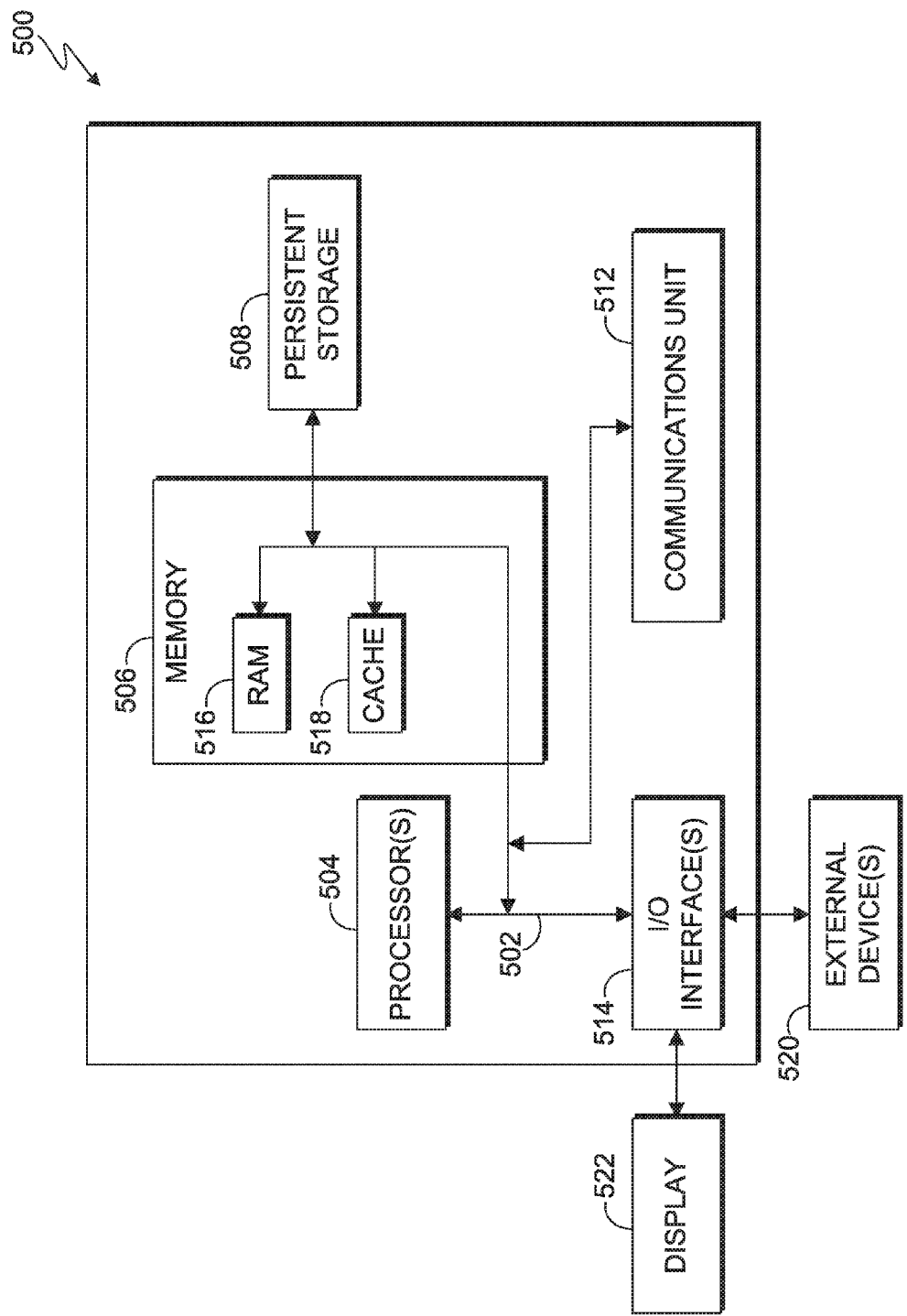
FIG. 5 is a block diagram of internal and external components of the computer systems of FIG. 1, in accordance with an embodiment of the present invention.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software (e.g., basic translator 118, flow controller 120, etc.) is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 140). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 110 through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for customizing a textual display, the method comprising:

authenticating, by the computer, an identify of a user;

retrieving, by the computer, a user profile that corresponds to the identity of the user, wherein the user profile contains unique information relating at least one of the user's professional background, user's education level, or user's expertise, and the user profile contains unique information relating to the user's reading comprehension abilities and information relating to a content specific user engagement level;

analyzing, by the computer, the unique information contained within the user profile to determine a textual content preference;

determining, by the computer, that the textual content preference is that a scientific terminology is to be displayed in a predetermined language;

receiving, by the computer, a content to be displayed;

identifying, by the computer, a language that is used in the content to be displayed, wherein the language of the content is different than the predetermined language;

analyzing, by the computer, the content by parsing a text contained within the content to identify any scientific terminology phrases contained within the text of the content;

determining, by the computer, a definition for each of identified scientific terminology phrases contained within the text of the content;

determining, by the computer, an equivalent phrase in the predetermined language for each of identified scientific terminology phrases contained within the text of the content;

modifying, by the computer, the content by replacing each of identified scientific terminology phrases contained within the text of content with the equivalent phrases in the predetermined language;

displaying, by the computer, the modified content; and determining, by the computer, an engagement level of the user with the modified content, and updating, by the computer, the information relating to the content specific user engagement level contained within the user profile based on the determined engagement level;

wherein the displayed content contains both the predetermined language and the language of the content.

* * * * *